United States Patent [19]
Wittenberg et al.

[11] Patent Number: 5,096,931
[45] Date of Patent: Mar. 17, 1992

[54] EXPANDABLE STYRENE POLYMERS

[75] Inventors: Dietmar Wittenberg, Mannheim; Klaus Hahn, Kirchheim; Uwe Guhr, Gruenstadt; Hans Hintz, Ludwigshafen, all of Fed. Rep. of Germany; Michael P. O'Callaghan, deceased, late of Staten Island, N.Y., by Carole A. O'Callaghan, executrix; Michael Riethues, Ludwigshafen, Fed. Rep. of Germany

[73] Assignee: BASF Aktiengesellschaft, Ludwigshafen, Fed. Rep. of Germany

[21] Appl. No.: 695,090

[22] Filed: May 3, 1991

[30] Foreign Application Priority Data

May 4, 1990 [DE] Fed. Rep. of Germany ....... 4014261

[51] Int. Cl.$^5$ .............. C08J 9/12; C08J 9/14
[52] U.S. Cl. .......................... 521/82; 521/56; 521/59; 521/60; 521/98; 521/139; 521/910
[58] Field of Search ........ 521/82, 56, 59, 60, 521/139, 98, 910

[56] References Cited

U.S. PATENT DOCUMENTS

| | | | |
|---|---|---|---|
| 4,278,768 | 7/1981 | Di Giulio et al. | 521/139 |
| 4,306,036 | 12/1981 | Corbett | 521/79 |
| 4,307,202 | 12/1981 | Corbett | 521/79 |
| 4,312,910 | 1/1982 | Suh et al. | 521/79 |
| 4,323,655 | 4/1982 | DiGiulio et al. | 521/139 |

*Primary Examiner*—Morton Foelak
*Attorney, Agent, or Firm*—Oblon, Spivak, McClelland, Maier & Neustadt

[57] ABSTRACT

An expandable styrene polymer containing
a) a styrene polymer,
b) from 0.05 to 3% by weight, based on a), of water,
c) from 0.001 to 1% by weight, based on a), of a finely divided organic polymer having a water absorption capacity of 10 g/g or more,
d) from 0.5 to 8% by weight, based on a), of a $C_3$- to $C_6$-hydrocarbon, and, if desired,
e) conventional additives in effective amounts, have good flow properties and low adhesion during prefoaming.

6 Claims, No Drawings

EXPANDABLE STYRENE POLYMERS

EXPANDABLE STYRENE POLYMERS

The present invention relates to expandable styrene polymers which contain small amounts of a waterabsorbent organic polymer.

Expandable styrene polymers are prepared on an industrial scale by suspension polymerization, giving polymer beads with an internal water content of up to about 2 % by weight. On storage, the water gradually escapes from the beads and results in unsatisfactory flow properties of the product. It is therefore necessary to drastically reduce the water content by careful and prolonged drying to give a product with a long shelf life. During this drying, however, some of the readily volatile blowing agent is simultaneously lost. However, the water contained in the expandable styrene polymer principally acts as a blowing agent. It is therefore desirable to increase the water content in order either to reduce the amount of low-boiling hydrocarbons used as blowing agent or to increase the expandability with the same amount of blowing agent.

It is an object of the present invention to improve the flow properties of expandable polystyrene. It is a further object of the present invention to develop an expandable polystyrene which can be prepared without prolonged drying. A final object is to reduce the content of organic blowing agents in expandable polystyrene and thus to reduce the level of environmental pollution during foam production.

We have found that, surprisingly, these objects are achieved by using small amounts of a water-absorbent organic polymer.

The present invention accordingly provides an expandable styrene polymer containing a) a styrene polymer, b) from 0.05 to 3% by weight, based on a), of water, c) from 0.001 to 1% by weight, based on a), of a finely divided organic polymer having a water absorption capacity of 10 g/g or more, d) from 0.5 to 8% by weight, based on a), of a $C_3-$ to $C_6$-hydrocarbon, and, if desired, e) conventional additives in effective amounts.

The present invention also provides a styrene polymer foam having a density of from 0.01 to 0.1 g/cm$^3$ and containing from 0.001 to 1% by weight of a finely divided organic polymer having a water absorption capacity of 10 g/g or more.

The principal component a) contained in the novel products is polystyrene and/or a styrene copolymer containing 50% by weight or more, preferably 80% by weight or more, of copolymerized polystyrene. Examples of suitable comonomers are α-methylstyrene, ring-halogenated styrenes, ring-alkylated styrenes, acrylonitrile, esters of acrylic or methacrylic acid with alcohols having from 1 to 8 carbon atoms, N-vinylcarbazole, maleic acid and maleic anhydride. The polystyrene may advantageously be copolymerized with a small amount of a chain-branching agent, ie. a compound containing more than one, preferably two, double bonds, such as divinylbenzene, butadiene or butanediol diacrylate. The branching agent is generally used in an amount of from 0.005 to 0.05 mol-%, based on styrene.

The styrene polymer advantageously used has a molecular weight and molecular weight distribution as described in EP-B 106 129 and DE-A 39 21 148.

It is also possible to use a mixture of different styrene polymers, as described, for example, in DE-A 39 01 329, 39 08 238, 39 36 596, 39 31 862 and 39 16 602.

As component b), the novel expandable styrene polymer contains from 0.05 to 3% by weight, preferably from 0.2 to 2.5% by weight, in particular from 0.3 to 1.5% by weight, of water, generally in highly disperse form in the polymer.

As component c), which is essential to the invention, the novel expandable styrene polymer contains from 0.001 to 1% by weight, preferably from 0.002 to 0.5% by weight, in particular from 0.05 to 0.2% by weight, of a finely divided organic polymer having a water absorption capacity of 10 g/g or more, generally from 10 to 100 g/g, preferably from 20 to 80 g/g. The water absorption capacity is determined by treatment with physiological saline solution containing 0.9% of sodium chloride.

The organic polymer used generally has a mean particle size of from 1 to 100 μm.

Examples of suitable water-absorbent organic polymers, also known as superabsorbers, are crosslinked or partially crosslinked (ie. from 10 to 90% crosslinked) organic polymers containing from 40 to 62% by weight, preferably from 50 to 62% by weight, of carboxyl groups, all or some of which may have been neutralized, such as polyacrylic acid, polymethacrylic acid and copolymers based on acrylic acid and/or methacrylic acid, possibly containing minor amounts of other copolymerizable monomers, such as (meth)acrylates, (meth)acrylamides, vinyl esters, styrene and the like. Branching of the polymer is generally achieved by carrying out the polymerization in the presence of small amounts, for example from 0.001 to 1 mol-%, of a monomer containing two or more ethylenically unsaturated double bonds.

The carboxyl-containing polymers are advantageously in from 10 to 100 %, in particular from 50 to 100%, neutralized form, preferably as alkali metal salts. Polymers of this type and processes for their preparation are described, inter alia, in U.S. Pat. Nos. 4,286,082 and 4,769,427, GB-A-2,146,342 and DE-A-38 43 780.

As component d), the expandable styrene polymer contains, as a conventional blowing agent, from 0.5 to 8% by weight, preferably from 1 to 5% by weight, based on a), of a $C_3$- to $C_6$-hydrocarbon, such as propane, n-butane, isobutane, n-pentane, isopentane, neopentane and/or hexane. Preference is given to a commercially available mixture of pentane isomers.

As component e), the expandable styrene polymer may contain conventional assistants, such as dyes, pigments, fillers, stabilizers, flameproofing agents, synergists, nucleating agents, lubricants and the like in conventionally effective amounts.

Other suitable additives are poly(2,6-dimethyl)-1,4-phenylene ether and poly-1,4-phenylene sulfide (cf. DE-A-39 04 370 and DE-A-39 24 868). These additives increase the heat distortion resistance of the foam. Other suitable additives are styrene-soluble elastomers (cf. DE-A-39 15 602), which increase the elasticity of the foam.

Component c), which is essential to the invention, may on the one hand be uniformly distributed in component a). In this form, it binds the small amount of water included in the styrene polymer phase and prevents exudation of the water at the particle surface. The water may thus also act as a blowing agent during expansion. However, component c) may also be in the form of a surface coating, in which case it binds the water exuded from the styrene polymer particles during storage, prevents adhesion of the particles and improves the flow properties. It is also possible for some of component c) to be uniformly distributed in component a) and for some to be in the form of a surface coating.

The expandable styrene polymers are generally in particle form, in particular in bead form, advantageously having a mean diameter of from 0.05 to 6 mm, in particular from 0.4 to 3 mm. They are prepared by conventional suspension polymerization. To this end, styrene, if desired with addition of further comonomers, is polymerized in aqueous suspension in the presence of a conventional suspension stabilizer by means of freeradical catalysts. A regulator and/or a chain-branching agent are advantageously used in the polymerization, for example in an amount of from 0.005 to 0.05 mol-%. The blowing agent and, if used, the additives may be introduced before the polymerization or added to the batch during the polymerization or when the polymerization is complete. The addition of component c) according to the invention is expediently effected to the styrene phase before commencement of polymerization and/or by coating the polymer particles when the polymerization is complete.

When the polymerization is complete, the beadform, expandable styrene polymer obtained is separated off from the aqueous phase, washed and dried and, if desired, coated.

To produce a foam, the expandable styrene polymer is expanded in a conventional manner by heating to above its softening point, for example using hot air or preferably using steam. The foam particles obtained can be further expanded by reheating after cooling and possibly after interim storage. They may subsequently be welded in a conventional manner in a mold which does not close in a gas-tight manner to give moldings.

The foam obtained generally has a density of from about 0.01 to 0.1 g/cm$^3$, and is used, inter alia, as a thermal and sound insulator, as a cushioning material and for shock-absorbent packaging materials. The foam has a greatly reduced tendency toward electrostatic charging.

In the examples, parts are by weight.

EXAMPLES

A mixture of 150 parts of water, 0.1 part of sodium pyrophosphate, 100 parts of styrene, in which the amount of polyacrylic acid given in the table is suspended, the polyacrylic acid being in 80% sodium salt form, and having a degree of crosslinking of about 88% and a water absorption capacity, measured in physiological saline solution, of about 45 g/g and a particle size of less than 80 μm (Luquasorb HC 9797 from BASF Aktiengesellschaft in fine powder form), 0.45 part of benzoyl peroxide, 0.15 part of tert-butyl perbenzoate and the amount of n-pentane given in the table was heated to 90° C. with stirring in a pressure-tight stirred reactor. After 2 hours at 90° C., 4 parts of a 10% strength aqueous solution of polyvinylpyrrolidone were added as suspension stabilizer. The mixture was then stirred for a further 2 hours at 90° C., subsequently for 2 hours at 100° C. and finally for 2 hours at 120° C.

After cooling to room temperature, the resultant bead polymer (mean particle diameter 1.5 mm) was separated off, washed and then freed from adhering surface water by flash drying.

The bead-form, expandable polymer was subsequently coated with the amount of Luquasorb LC 9797 given in the table by tumbling for 3 minutes in a paddle mixer (Lödige type).

In order to determine the flow behavior, 1 kg of each of the bead polymers was first stored for 48 hours in a sealed glass vessel. The time taken for the product to run through a funnel comprising smoothed V$_2$A steel was then measured. The diameter of the funnel, which had an angle of inclination of 45°, was 250 mm at the top and 20 mm at the bottom. In order to measure the flow properties, the bottom of the funnel was sealed and 1 kg of the polymer having a bead size of from 1.0 to 2.0 mm was introduced. The bottom was then opened, and the time required for the funnel to empty determined. The results obtained are given in the table.

The adhesion during prefoaming was investigated using a metal-framed sieve (mesh width: 0.1 to 0.2 mm) measuring 1000×800×250 mm located in a sealed metal housing with steam inlet and withdrawal unit. The steam at 120° passed into the prefoaming unit from below, passed through the wire mesh carrying the products to be tested and was able to escape again through the steam withdrawal unit. Before commencing the tests, the apparatus was first preheated for about 5 minutes. 500 g of the expandable bead polymer having a particle diameter of from 1.0 to 2.0 mm were then distributed uniformly on the wire mesh, the apparatus was closed and the steam valve was opened. After the time given in the table, the steam valve was closed again and the metal housing was opened. The bulk density and the adhesion of the prefoamed material were then determined.

The degree of adhesion was classified by the following groups:

0: no adhesion: = no agglomerates
1: slight adhesion: = beads adhered weakly, but the agglomerates are easy to separate by gentle tapping with the palm of the hand
2: moderate adhesion: = entirely comprising agglomerates which can readily be broken up by hand
3: considerable adhesion: = the agglomerates are so stable that they can be broken down manually only with difficulty and with considerable deformation of the beads
4: very considerable adhesion: = the expanded particles are fully welded to one another.

The water content was determined using an E 452 automatic Karl-Fischer titrator from Metrohm AG, Herisau (Switzerland).

The results obtained are given in the table.

|  | Example No. | | | | | | | | |
|---|---|---|---|---|---|---|---|---|---|
|  | 1 Comparison | 2 | 3 | 4 | 5 | 6 | 7 | 8 | 9 |
| Luquasorb HC 9797 [% by weight] (incorporated) | — | 0.005 | 0.01 | 0.005 | 0.005 | 0.01 | — | — | 0.05 |
| Luquasorb HC 9797 [% by weight] | — | — | — | 0.02 | 0.1 | 0.1 | 0.04 | 1.0 | — |

-continued

| | Example No. | | | | | | | | |
|---|---|---|---|---|---|---|---|---|---|
| | 1 Comparison | 2 | 3 | 4 | 5 | 6 | 7 | 8 | 9 |
| (coated) n-Pentane [% by weight] | 7 | 7 | 5 | 7 | 4 | 7 | 7 | 7 | 4 |
| Water content [% by weight] | 0.5 | 0.7 | 0.8 | 0.7 | 0.7 | 0.8 | 0.5 | 0.5 | 1.9 |
| Flow behavior [sec/kg] | blocked | 40 | 35 | 30 | 23 | 20 | 30 | 22 | 25 |
| Prefoaming time [min] | 6 | 6 | 6 | 6 | 6 | 6 | 6 | 6 | 6 |
| Bulk density [g/cm$^3$] | 13.5 | 12.9 | 13.0 | 12.8 | 12.7 | 12.8 | 12.9 | 12.5 | 11.5 |
| Adhesion [Score 0–4] | 3–4 | 2–3 | 2 | 2 | 1–2 | 1 | 2–3 | 2 | 1–2 |

We claim:
1. A expandable styrene polymer containing
   a) a styrene polymer,
   b) from 0.005 to 3% by weight, based on (a), of water,
   c) from 0.001 to 1% by weight, based on (a), of a finely divided, crosslinked or partially crosslinked, organic polymer containing from 40 to 62% by weight of carboxyl groups, partially or entirely neutralized by salt formation and having a water absorption capacity of 10 g/g or more,
   d) from 0.5 to 8% by weight, based on a), of a $C_3$– to $C_8$– hydrocarbon, and, if desired,
   e) conventional additives in effective amounts.
2. An expandable styrene polymer as claimed in claim 2, containing, as component c), crosslinked or partially crosslinked polyacrylic acid in which 50% or more of the carboxyl groups are in the form of alkali metal salts.
3. An expandable styrene polymer as claimed in claim 1, in which component c) has a mean particle size of from 1 to 50 μm.
4. An expandable styrene polymer as claimed in claim 1, in which at least some of component c) is uniformly distributed in component a).
5. An expandable styrene polymer as claimed in claim 1, in which at least some of component c) is in the form of a surface coating.
6. A styrene polymer foam having a density of from 0.01 to 0.1 g/cm$^3$ and containing from 0.001 to 1% by weight of a finely divided, crosslinked or partially crosslinked organic polymer containing from 40 to 62% by weight of carboxyl groups partially or all neutralized by salt formation and having a water absorption capacity of 10 g/g or more.

* * * * *